Nov. 19, 1968  R. A. WALLERS ET AL  3,411,826
TUNNEL BORING MACHINE

Filed May 26, 1966  9 Sheets-Sheet 1

Fig.1.

INVENTORS.
RICHARD A. WALLERS
JOHN C. HASPERT
By Huebner & Worrel
ATTORNEYS.

INVENTORS
RICHARD A. WALLERS
JOHN C. HASPERT
By Huebner & Worrel
ATTORNEYS.

INVENTORS.
RICHARD A. WALLERS
JOHN C. HASPERT
By Huebner & Worrel
ATTORNEYS.

Nov. 19, 1968 R. A. WALLERS ET AL 3,411,826
TUNNEL BORING MACHINE
Filed May 26, 1966 9 Sheets-Sheet 6

INVENTORS.
RICHARD A. WALLERS
JOHN C. HASPERT
BY Huebner & Worrel
ATTORNEYS.

Nov. 19, 1968 R. A. WALLERS ET AL 3,411,826
TUNNEL BORING MACHINE
Filed May 26, 1966 9 Sheets-Sheet 9

INVENTORS.
RICHARD A. WALLERS
JOHN C. HASPERT
BY Huebner & Worrel
ATTORNEYS.

3,411,826
TUNNEL BORING MACHINE
Richard A. Wallers, Balboa Island, and John C. Haspert, Arcadia, Calif., assignors to Smith Industries International, Inc., Gardena Heights, Calif., a corporation of California
Filed May 26, 1966, Ser. No. 553,176
12 Claims. (Cl. 299—31)

ABSTRACT OF THE DISCLOSURE

A tunnel boring machine which includes an exterior shell having a surface exposed to the earth bore made by a cutter, the shell having an articulated or segmented portion formed of a plurality of circumferential sections or segments each removably but rigidly secured to a circumferentially adjacent section so that the exposed surface diameter of the shell may be altered for operation in different size bores by adding or removing sections, together with a rotatably driven cutter, and other operative appurtenances.

Summary of the invention

The invention is a self-propelled tunnel boring machine, embodying a rotatable cutter, cutter drive means engaged with and adapted to rotate the cutter, an exterior shell generally conforming to the bore of the tunnel being cut, which shell affords protection for the boring machinery enclosed therein, and for workmen. Support means are provided within the shell to slidably mount the cutter drive means. Also provided are means for axially moving the cutter relative to the shell, and means are provided for pushing the machine forward within a tunnel being cut. The shell is preferably, although not necessarily, made in three coaxially aligned parts, namely, a lead ring, a rear protective shield and a central main housing, the three parts being detachably connected in series as indicated.

The central main housing which encloses a large portion of the boring machinery is made up of a plurality of sections or segments collectively forming a cylinder. These sections are detachably but rigidly connected together. Sections may be added or subtracted to increase or decrease the diameter of the housing in order to accommodate the machine for cutting tunnels of various sizes. When the main housing is enlarged or diminished in diameter, ordinarily a different lead ring will be attached and a different protective shield will be attached to generally coincide with the change in diameter of the main housing.

In addition to the foregoing, the invention includes a novel type of adjustable mounting for the cutting mechanism whereby the axis of the tunnel bore may be changed, and includes other operative appurtenances.

This invention relates to a machine for boring tunnels, and more particularly to a self-propelled machine capable of drilling large diameter tunnels.

Prior to this invention, large diameter, self-propelled tunnel boring machines generally were not readily adaptable for use in borning tunnels of different diameters. This was particularly true of machines which had an exterior shell that served as a protection for the internal components of the machine and workmen in the tunnel. Thus, each machine was specifically designed for a particular tunnel diameter, and very few, if any, of the parts of the machine were adapted to be used in a machine which bored a tunnel of a different diameter. It is apparent that such inflexibility of tunnel boring machines not only contributed to the direct expense of drilling tunnels due to the multitude of machines needed for different tunnel diameters, but also increased the time required to drill tunnels of varying diameters.

In order to alleviate such problems in boring tunnels, it is an object of this invention to provide a self-propelled tunnel boring machine having a segmented outer shell which can be quickly varied in diameter by adding or removing sections therefrom, to conform to the desired diameter of a tunnel.

Another object of this invention is to provide a self-propelled tunnel boring machine which is axially movable by hydraulic push rams and can be readily adjusted by radially movable elements in order to change its direction of movement.

Still another object is to provide a self-propelled tunnel boring machine with a rotary cutter head which can be adapted to a wide variety of soil conditions and wherein torque stabilizing elements are provided in the shell of the machine.

Another object of this invention is to provide a self-propelled tunnel boring machine wherein the line and grade of the bore can be controlled by the positioning of the cutter off center with respect to a center line passing through the shell of the machine.

A further object of this invention is to provide a self-propelled tunnel boring machine including a radially adjustable push ring structure adapted to be positioned within a tunnel as a structure against which hydraulic rams of a said machine can be braced in order to axially move the machine.

A still further object of this invention is to provide a self-propelled tunnel boring machine which is self-contained and is capable of quickly and efficiently drilling a large diameter tunnel.

Other objects and advantages of this invention will be apparent from the following description and drawings wherein.

Referring to the drawings, the tunnel boring machine generally includes a cylindrical outer shell 10, within which a circular cutter 12, in the form of a wheel, is rotatably mounted and diametrically positioned at the forward end thereof. The circular cutter 12 has cutting elements (not shown) on its face which are adapted to drill into the earth as cutter 12 is rotated.

Slidably mounted for longitudinal movement within the shell 10 is an internal assembly 13 that functions as a cutter drive means. It includes a cylindrical drive shaft 14, generally axially aligned with the axis of shell 10, which is connected at its forward end to the center of circular cutter 12. At its rear end, drive shaft 14 is connected to the center of a rotatable circular bull gear 16, which is located centrally and diametrically positioned within shell 10. Bull gear 16 is surrounded by bull gear housing 17, and mounted thereon are motors 18 (preferably of the commercially obtainable, hydraulic type), which are adapted to turn bull gear 16. When these motors 18 are actuated so as to rotate bull gear 16, it, in turn, rotates drive shaft 14 and cutter 12.

Thus, when cutter 12 is rotated, it will dig into earth which it engages, thereby boring a tunnel as it is advanced through the ground. Axial movement of cutter 12 is caused by slidably moving the internal assembly 13 longitudinally within shell 10, and by axially moving the entire tunnel boring machine including shell 10.

Changes in line or grade of the tunnel being bored are made by deviating the axis of rotation of cutter 12 relative to the axis of the tunnel previously bored. Removal of the spoil 21 is by a conveyor 20 that is supported within shell 10. This conveyor 20 extends from the rear of cutter 12 to beyond the rear of the machine, so that it ends over equipment (not shown) for transporting the spoil 21 from the tunnel.

The cylindrical shell 10 is comprised of a forward annular lead ring 22, a central segmented main housing 24, and a rear protective shield 26, which are detachably secured to each other by bolts or other suitable means.

The diameter of lead ring 22 is selected to approximately correspond with the diameter of the tunnel which is to be bored. However, at times the ring 22 may be smaller in diameter than the diameter of the tunnel depending upon earth formation. Its axial length is relatively short, and generally is only slightly longer than the axial length of cutter 12, which can be retracted within it.

An inwardly extending flange 28 protrudes radially from the rear of ring 22. Flange 28 provides a surface to which an inwardly extending flange (described later) that protrudes radially from the front of main housing 24, can be engaged. Since lead ring 22 is the first portion of shell 10 to contact earth being drilled, it often is thicker and stronger than the rest of the shell, and its forward lip 30 may be sloped to a sharpened front edge in order to facilitate movement of the machine.

Figure 3:
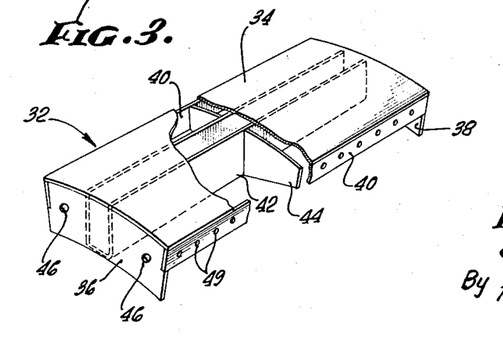
FIGURE 3 is a perspective view, partly fragmented, of a single segment or section of the outer shell of the tunnel boring machine.

The main housing 24 is about the length of drive shaft 14, and surrounds the internal assembly 13. It is comprised of a plurality of curved segments or sections 32 which extend lengthwise around its circumference. As best seen in FIGURE 3, each segment or section 32 includes a curved peripheral face plate 34, from which extends inwardly a front end plate 36, which forms the surface to which flange 28 of ring 22 is secured, a rear end plate 38, and a pair of radially aligned side plates 40. Integral rigidity for each section 32 is provided by a centrally positioned U-shaped rib 42 extending longitudinally between front end plate 36 and a rear end plate 38. A transverse gusset 44 extends between the opposing side plates 40 in each section so as to provide additional structural rigidity.

Each of the segments or sections 32 is provided with holes 46 in its end plates 36 and 38, for securing it between the rear flange 28 of lead ring 22 by bolts or other suitable fastening means and an inwardly projecting front flange 48 of shield 26. Holes 49 are provided in side walls 40 for fastening each of the segments or sections 32 to each other, as by bolts 50.

The diameter of main housing 24 can be varied by increasing or decreasing the number of segments or sections 32, and their relative angle of juncture to each other. Thus, when the adjacent side walls 40 of segments or sections 32 are connected by bolts 50 passing through holes 49, as in FIGURE 4, a nearly perfect, smooth cylinder is formed, and the entire surface of the adjacent radially extending side walls 40 are flush against each other.

Figures 6, 7, 8:
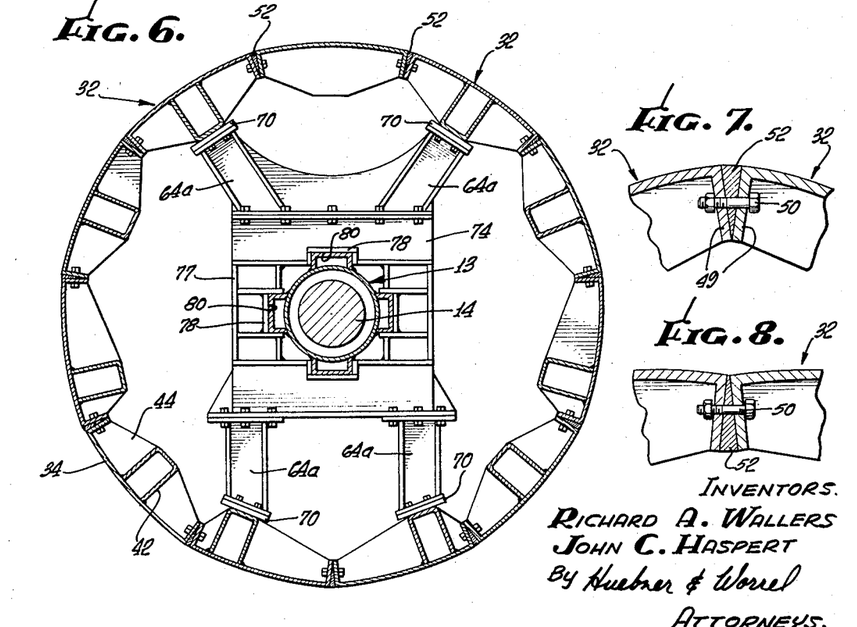
FIGURE 6 is a cross-sectional view as in FIGURE 4, with the circumference of the shell reduced by removing shell segments or sections.
FIGURE 7 is a fragmented enlarged view as in FIGURE 6, showing the juncture of adjacent shell segments or sections, and a triangular shaped wedge placed between them.
FIGURE 8 is an enlarged view of the joint between the shell segments or sections, as in FIGURE 7, but with the wedge inverted to fill the space between the sections as when the shell is enlarged in circumference by adding a section thereto.

On the other hand, when one or more of the sections 32 is removed, as in FIGURE 6, the diameter is reduced and the main housing 24 is an interrupted cylinder, with gaps between each segment. Thus, it is desirable to insert wedges 52, as best seen in FIGURE 7, between the joined side plates 40 of each section 32, in order to fill the space at the junctures and brace the sections against one another. Conversely, if the diameter of main housing 24 is to be increased, sections 32 can be added so that a clamshell shape results. In this latter situation the wedges 52 are inverted to brace the adjacent side plates 40, as best shown in FIGURE 9.

Protective shield 26 has a diameter selected to correspond to the diameter of the housing 24. It is of sufficient axial length to form at least a top cover (though it is shown entirely surrounding the machine) extending from the rear of main housing 24 rearwardly into the tunnel. This provides protection for workmen and the interior of the machine to the rear of the main housing 24 when the tunnel boring machine advancing apparatus (to be described later) has been extended to its fullest length and completed a drilling cycle. In other words, the protective shield 26 must be of a sufficient length, when boring in earth formation, so that when the machine is extended to its full reach beyond the tunnel liner 56 there is no gap to allow loose dirt and rocks to fall from the roof of tunnel 54. The length of the shield 26 may vary depending on the size and stroke of the machine. The protective shield is shown as right cylindrical in shape in the drawings, but may have only its rear upper portion extending back to cover the gap, since this would be sufficient protection from falling debris.

Figure 9:
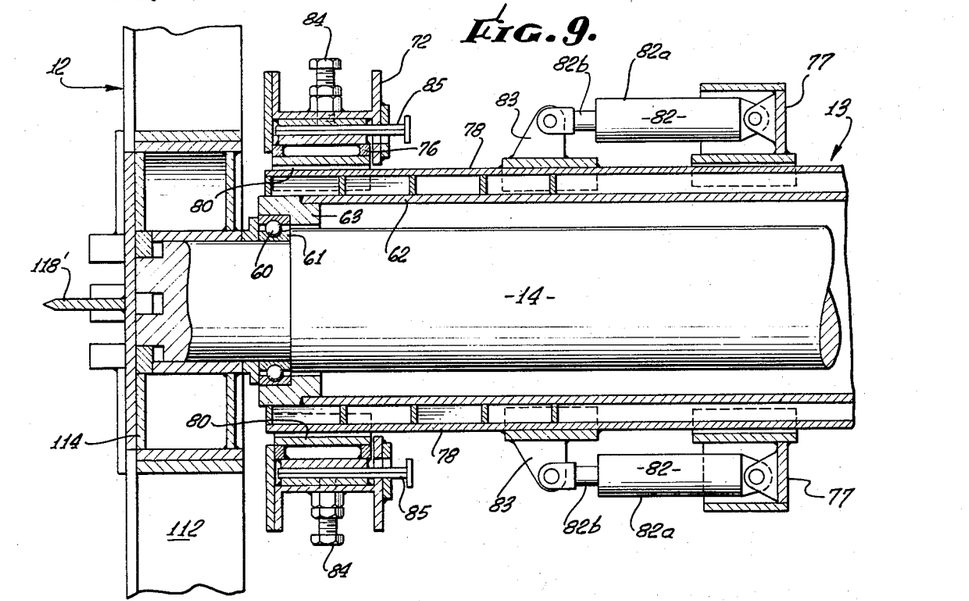
FIGURE 9 is a fragmented longitudinal sectioned view of the drive shaft and associated members, taken through 9—9 in FIGURE 2.

As shown in FIGURE 9, drive shaft 14 is journaled at its forward end for rotatable movement in circumferentially positioned ball bearings 60, which are mounted within an annular race structure 61. Race structure 61, in turn, is supported within cylindrical drive shaft housing 62, which is axially aligned with shaft 14 by a collar 63 secured within the forward end of housing 62.

As a supporting means for the internal assembly 13, a forward set of legs 64, and a rearward set of legs 66, each set normally three or four in number, extend from engagement with the inside surface of main shell 24 to support drive shaft housing 62 for longitudinally slidable movement relative to shell 10.

Figure 4:
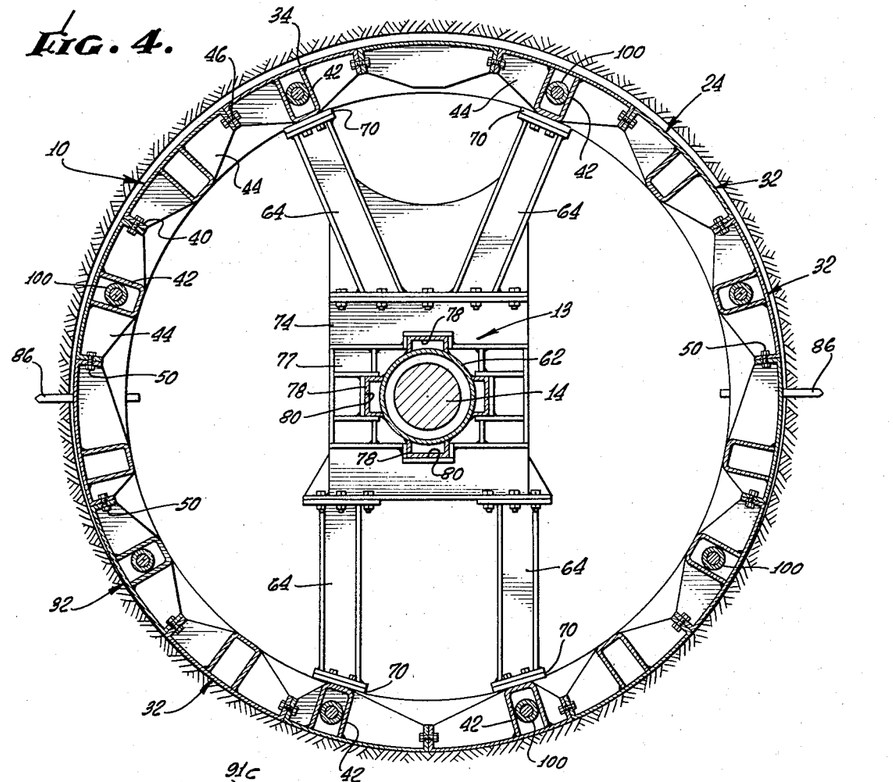
FIGURE 4 is a cross-sectional view of the machine, taken through 4—4 in FIGURE 2.
Figure 5:
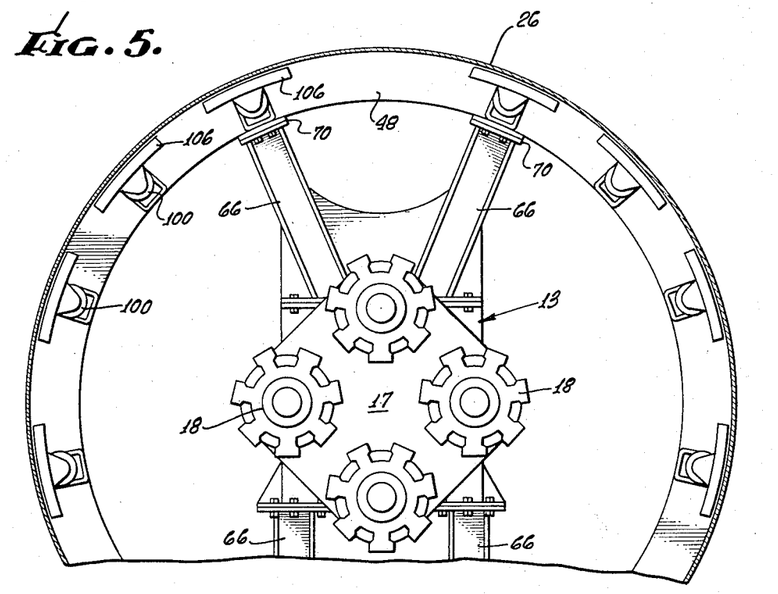
FIGURE 5 is a cross-sectional view of the machine, taken through 5—5 in FIGURE 2.
Figure 10:
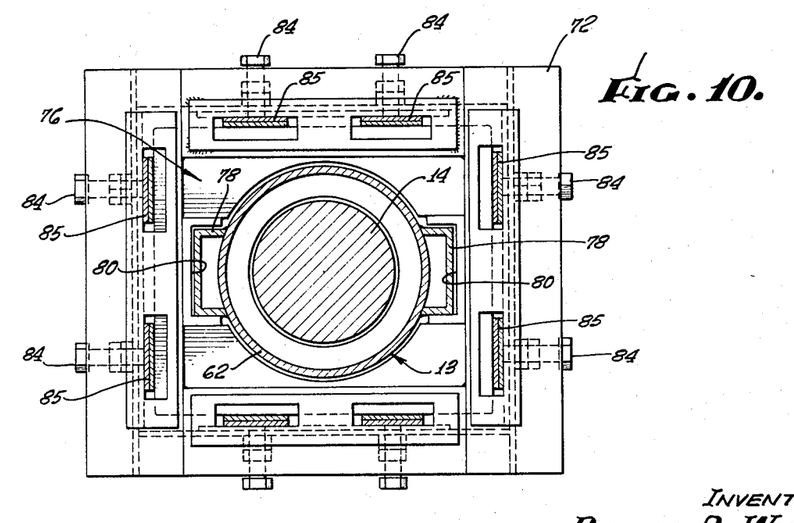
FIGURE 10 is a cross-sectional view of the drive shaft and associated elements taken through 10—10 in FIGURE 2.
Figure 11:
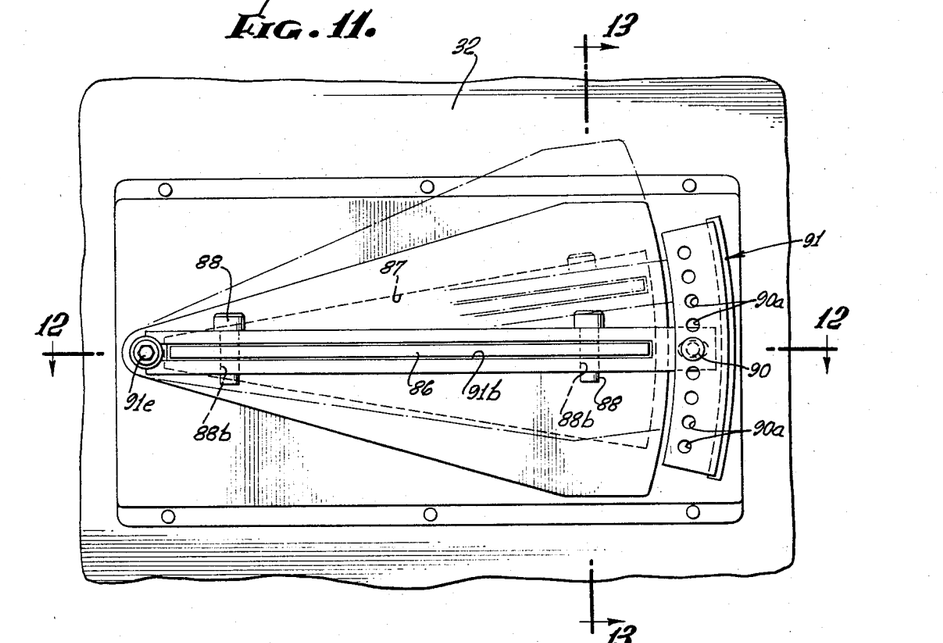
FIGURE 11 is an enlarged top plan view of a torque stabilizing fin disposed on the exterior periphery of the tunnel boring machine shell.
Figure 12:
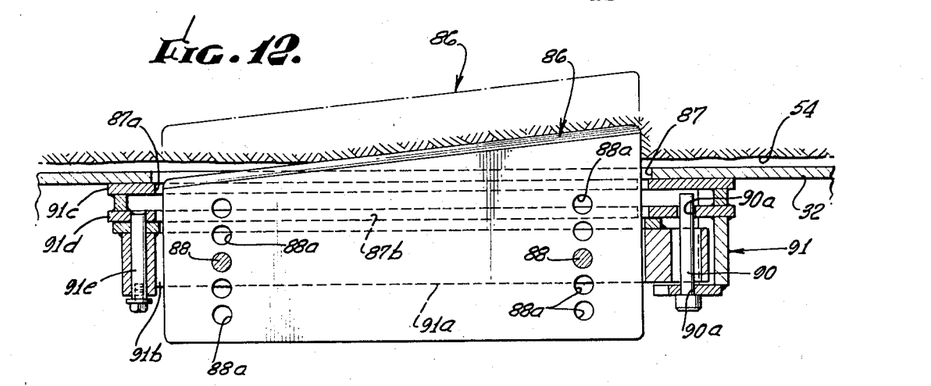
FIGURE 12 is a sectional view of the torque stabilizing fin taken through line 12—12 in FIGURE 11.
Figure 13:
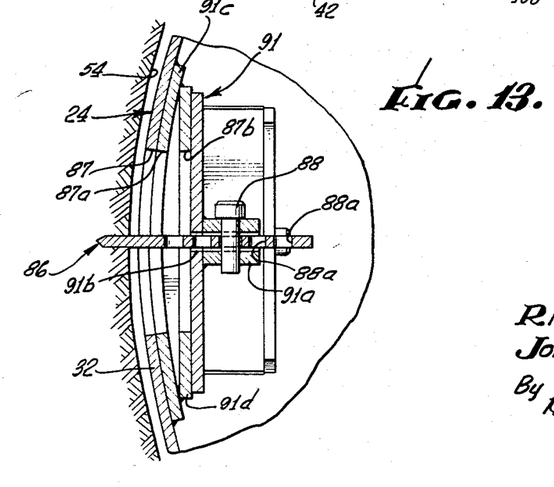
FIGURE 13 is a sectional view of the torque stabilizing fin taken through line 13—13 in FIGURE 11.

In the embodiment of this invention best viewed in FIGURES 4 and 10, the outer ends of each of the sets of legs 64 and 66 are securely bolted to plates 70 mounted on the bottom of the U-shaped ribs 42 of selected sections 32 that form the interior of main housing 24. The inner ends of the forward legs 64, and the inner ends of the rear legs 66, are bolted to forward and rear brackets 72 and 74, respectively.

A forward cage 76 and a rear cage 77, which cradle drive shaft housing 62, are, in turn, movably mounted within brackets 72 and 74, respectively. These cages 76 and 77, in cooperation with brackets 72 and 74, support drive shaft housing 62 for axially slidable movement therein.

The slidable movement is facilitated by providing longitudinally extending and protruding flat surfaced slide members 78 around the outside surface of drive shaft housing 62. These slide members 78 are matingly received within corresponding complementary longitudinal slide recesses 80 formed within the adjacent abutting internal surfaces of cages 76 and 77 and brackets 72 and 74.

In the embodiment of drive shaft housing 62 disclosed, there are four slide members 78 and complementary recesses 80 in the rear, as shown in FIGURE 4, and two slide members 78 and complementary recesses 80 in the front, as shown in FIGURE 10. However, as long as the proper adjustable sliding support is provided in accordance with this invention, the particular number of slide members 78 is not mportant.

In order to cause the housing 62 and the apparatus carried with it, such as shaft 14 and cutter 12, to slide axially relative to shell 10, a pair of longitudinally extending, hydraulically actuated rams 82, having a cylinder 82a, within which a piston 82b is mounted, are each pivotaly secured between a projecting portion 83 of slide member 78 and a part of rear cage 77, as best viewed in FIGURE 9. Thus, cutter 12 can be retracted within lead ring 22, as in FIGURE 2, or it may be extended ahead of lead ring 22, as in the dotted line viewed in FIGURE 2. Separate independently actuated controls (not shown) are provided for each of the rams 82.

As noted previously, some sections 32 of the main housing 24 can be added to increase the shell diameter or removed to decrease the shell diameter. This flexibility in size vastly increases the utility of the tunnel boring machine, and due to the particular rigid structure of the sections 32, and their bracing against each other, the strength of the shell is not sacrificed.

However, when the diameter of the main housing 24 is varied, the legs 64 and 66 are necessarily also varied in length. Thus, as in the form shown in FIGURE 6, when the diameter of the main housing 24 is reduced, the length of the legs is shortened so that, as shown, legs 64a are substituted for forward legs 64, though shims or other length changing means could be used. Also, rear legs 66 are likewise changed in length, though their modified form is not shown in the drawings.

When boring tunnels, it usually becomes necessary to vary the pitch and/or grade of the tunnel. Also, it may become necessary to bend the tunnel sideways from the axis of the bore. In order to accomplish this, the mounting of the drive shaft housing 62 within the forward legs 64 can be angled so that its axis of alignment, relative to shell 10, is slightly changed in any direction desired. This is done by adjusting the radially positioned set screws 84, which are mounted in forward brackets 72, and bear upon each side of axially movably mounted forward cage 76. As best seen in FIGURE 10, an adjusted location of screws 84, brackets 72, and cage 76, is shown in dotted lines. The mounting of rear cage 77 within rear brackets 74 is loose enough to permit these small angular changes of direction provided by adjusting set screws 84 in the forward cage 76.

Shims 85 interposed between set screws 84 and the contacted surface of forward cage 76, provide an additional adjusting means which can be used in conjunction with the set screws 84. That is, the number of shims on each side can be varied so that the angular alignment of drive shaft housing 62 mounted therein also varies.

In order to prevent torque from turning the machine when cutter 12 is drilling a tunnel, torque stabilizing fins 86, as shown in FIGURES 4, 11, 12 and 13, are mounted so as to project out from shell 10. They can be individually adjusted to engage the surrounding tunnel 54 with the amount of pressure desired. Also the adjustable features of the fins 86 may be utilized to correct torque roll of the machine which may develop as the drilling proceeds. In other words, during the drilling operation the machine will not just endeavor to rotate, but depending on the earth formation drilled the machine may endeavor to yawl, i.e. move off of line and grade, and the fins 86 can be adjusted to compensate for undesired movement.

As shown, the fins 86 project through wedge-shaped slots 87 in sections 32 of housing 24. They are mounted in assemblies 91 inside of slots 87 for both vertical and horizontal adjustment by shifting the locking bolts 88 in a series of holes 88a in the fins 86, and locking bolts 90 in holes 90a. Assembly 91 is essentially a flat plate larger than slot 87 and embodies a longitudinally extending central rib 91a within which is located a central slot 91b that is slightly longer than fin 86 and wider than fin 86 is thick. A pair of holes 88b, which receives bolts 88, extend laterally through each side of rib 91a adjacent to slot 91b, and provide a means for adjustably securing a fin 86 within the slot 91b of assembly 91.

A curved support plate 91c is secured inside of a section 32 around a slot 87, and has a fan-shaped slot 87a matching the shape and location of slot 87. And secured to and inside of curved plate 91c is a flat plate 91d, which has a slot 87b also matching the shape and location of slots 87 and 87a. Assembly 91 is pivotally secured to the bottom of flat plate 91d by a pivot bolt 91e which passes through assembly 91 near one end of slot 91b and is mounted in flat plate 91d near the adjacent end of slot 87b. It is adjustably locked in position when the bolt 90 is slid through hole 90b in the opposite end of slot 91b in assembly 91 and one of the set of holes 90a which are in flat plate 91d in the adjacent end of slot 87b.

Figure 14:
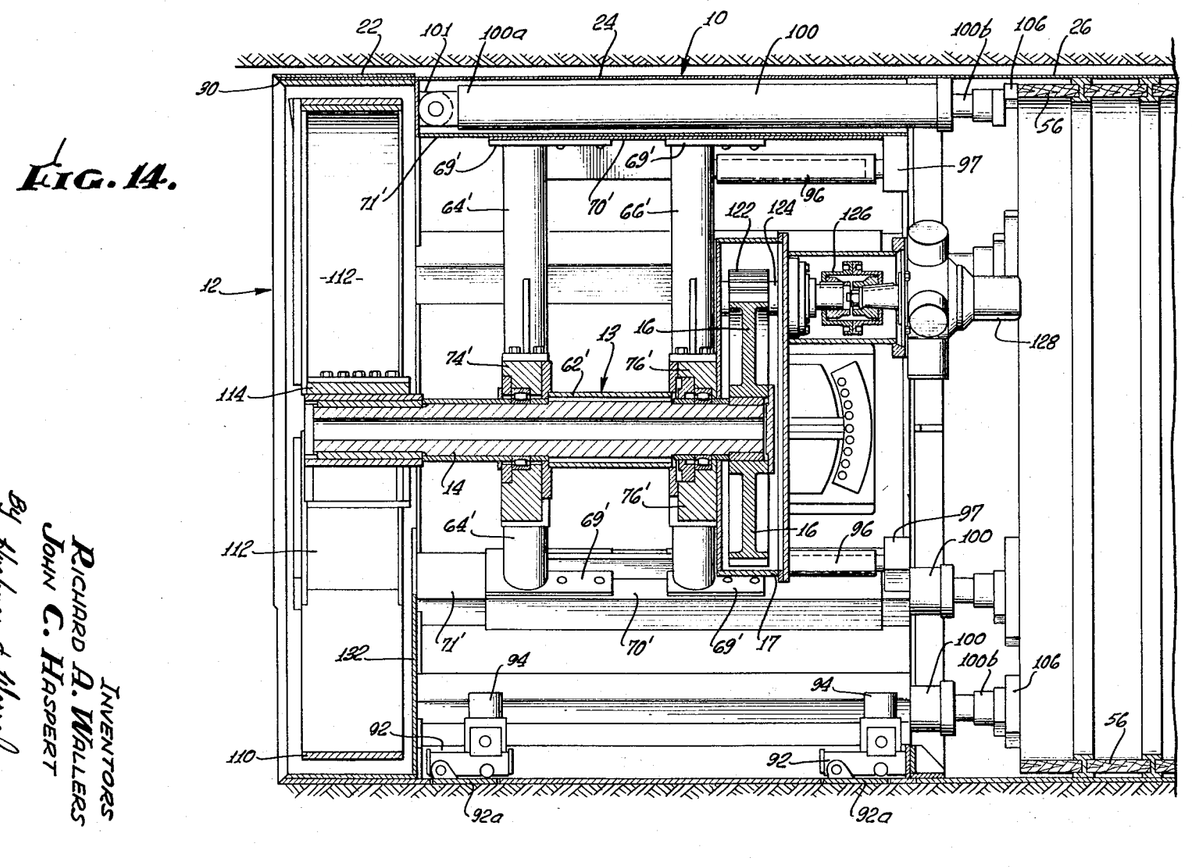
FIGURE 14 is a longitudinally sectioned view of a modification of the tunnel boring machine.
Figure 15:
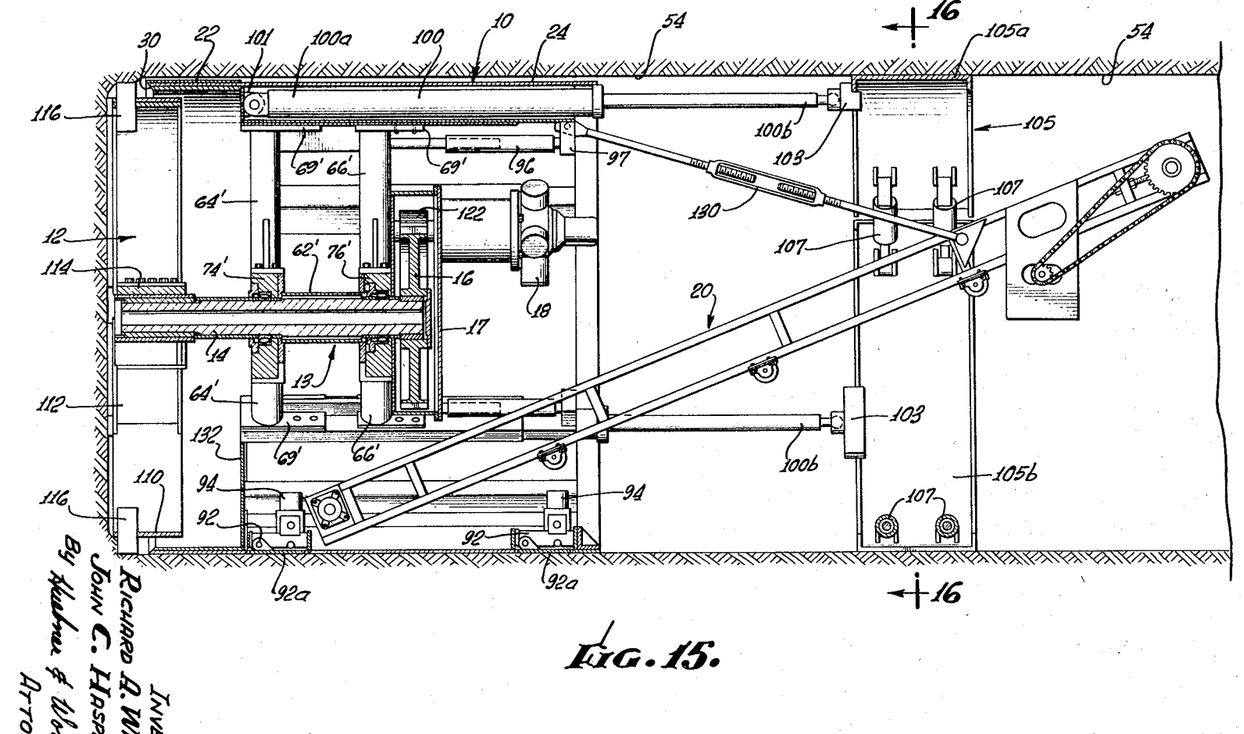
FIGURE 15 is a longitudinally sectioned view of the tunnel boring machine, as in FIGURE 14, showing a spoil remover conveyor and a hydraulically actuated push ring against which tunnel boring machine rams can be braced to push it forward.
Figure 17:
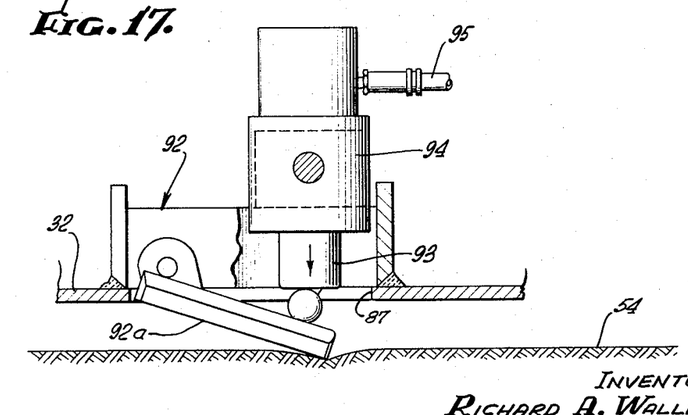
FIGURE 17 is an elevational view of a hydraulic ram actuated shoe or pad which can be used on the lower periphery of the tunnel boring machine shell, as shown in FIGURE 15.

A directional guide fin assembly 92, best seen in FIGURE 17, and environmentally illustrated in FIGURES 14 and 15 is provided on the underside of the machine 10 to support the machine and prevent it from drifting off the intended line and grade of the tunnel 54. The assembly 92 is actuatable so that a fin shoe portion 92a will move out through section 32, through a slot 87 to engage the tunnel 54. A piston 93, which is slidably mounted in a hydraulic cylinder 94 will engage the fin shoe 92a to position it. Hydraulic fluid is supplied by line 95 to cylinder 94 to control the movement of piston 93.

Figure 1:
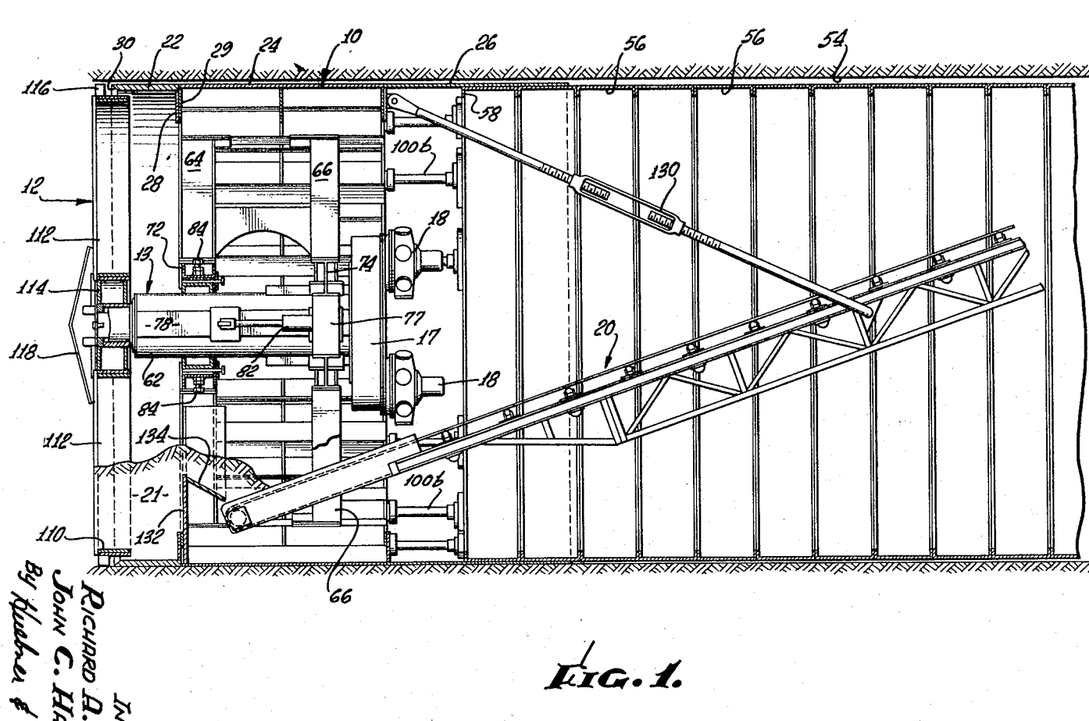
FIGURE 1 is a longitudinally sectioned view of a tunnel boring machine in accordance with this invention, including a tunnel liner and spoil conveyor.

While the assembly 92 is only illustrated in association with the modified form of the machine it is also used with the embodiment illustrated in FIGURE 1.

In the embodiment of this invention shown in FIGURES 14 and 15, instead of being slidably mounted as in the previous embodiment, the inner ends of the set of forward legs 64', and the set of rear legs 66', are firmly secured to brackets 74' and 76', respectively, and these brackets are, in turn, securely connected to drive shaft housing 62' without any intermediate slidable mounting. However, the outside ends of each of legs 64' and 66' carry plates or shoes 69', which are secured to channels 70', which are, in turn, slidably mounted on guide members 71' affixed to the internal surface of main housing 24, so as to provide a means for longitudinally slidable movement of the entire drilling assembly.

The internal assembly 13 is axially moved, in the form shown in FIGURES 14 and 15, by a hydraulic ram 96 longitudinally mounted between a rear leg 66' and a brace structure 97 protruding from the inside of shell 10. When ram 96 is retracted or extended, legs 66' and 64', as well as the other internal components of the machine, are moved axially relative to shell 10. While only one ram 96 is illustrated in FIGURE 14, a plurality of rams may be utilized to urge the assembly 13 forwardly and rearwardly. Further, in this embodiment a push ring element 105 (to be described) is included for use when drilling in stable material. Otherwise, the machine is substantially the same as described previously, though only three legs 64' and 66' are used in each set instead of four, as in the prior embodiment.

The entire tunnel boring machine is moved longitudinally relative to tunnel 54, by retracting and extending a plurality of rams 100, which lie longitudinally just inside shell 10 and around the interior periphery thereof. These rams 100 are independently hydraulically actuated, and have one end of their cylinder 100a pivotally secured to an inwardly projection portion 101 of shell 10, and the opposite end of their piston 100b braced against the forward flange 58 of the front section of the tunnel liner 56, as in FIGURES 1 and 2. With the independent control of each circumferentially arranged ram 100 a cooperation may be established between the cutter 12 and shell 10. If the cutter 12 has been moved off center to change the line and grade of the tunnel, each or several of the hydraulic rams 100 may be varied relative to the amount of push of the shell to help keep the unit on the proper line and grade. As shown in FIGURE 14, an intermediate support structure 106 may be placed between the rear end of the piston 100b and the front of the tunnel liner 56 in order to spread the load and protect the liner 56. The tunnel liner 56 in FIGURE 14 is also an example of a modified form from that in the other drawings, but neither of the liners constitutes a part of this invention.

Figure 16:
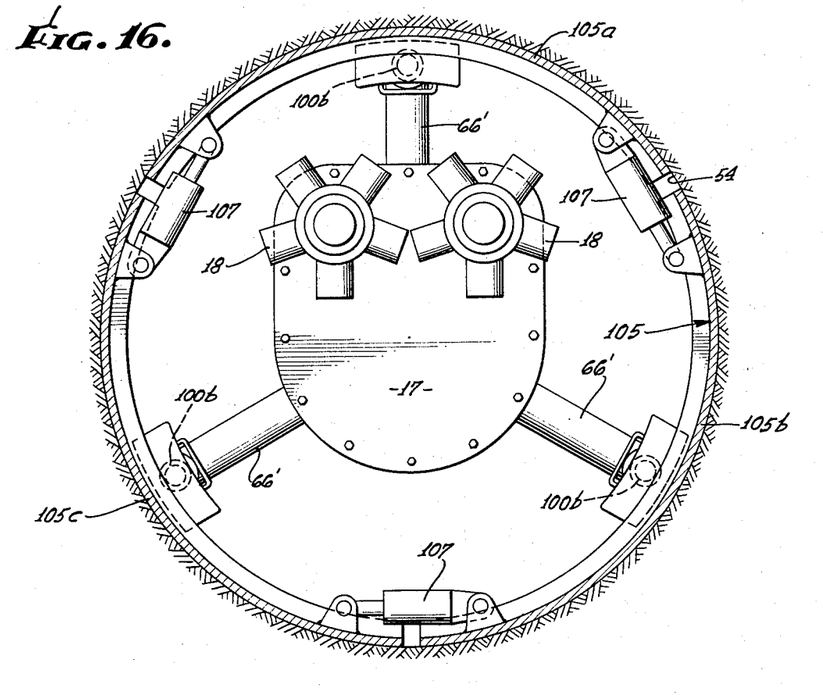
FIGURE 16 is a cross-sectional view of the push ring, taken through 16—16 in FIGURE 15.

When drilling in rock formation where tunnel liners are not essential the embodiment illustrated in FIGURES 15 and 16 are utilized. A push ring structure 105 is included with the shell 10.

The push ring element 105, best seen in FIGURE 15 and 16, includes a segmented shell made of preferably three segments 105a, 105b and 105c, which are interconnected by pivotally mounted rams 107 located just inside the outer shell. While three segments are preferred it has been found that a ring of multiple sections will also accomplish the desired result. By extending these rams 107, the push ring segments 105a, 105b and 105c can be adjusted so that they each extend and tightly engage a rock tunnel wall. Thus, the push ring 105 will serve as a brace for rams 100. When the rams 107 are retracted, the push ring 105 connected to the rams by loose ball and socket connections 103 can be moved to a new location which, of course, is required in order to push the machine forward when rams 100 within the machine have reached their maximum extension or reach. As the rams 100 are retracted the ring structure will be dragged forward to position it for the next cycle of the operation.

Circular cutter 12 is comprised of a circumferential outer wheel 110, which is connected by several inwardly radiating arms 112 to a central hub 114, secured to the forward end of drive shaft 14. Secured to the front of arms 112 are a plurality of concentrically arranged cutter teeth (not shown), each of which is angled so as to be aligned substantially tangentially with the circumference of each tooth's rotation. The diameter of cutter 12 is slightly less than the internal diameter of lead ring 22, so that it can rotate therein and some room is left for slight angular adjustment of its alignment.

Figure 2:
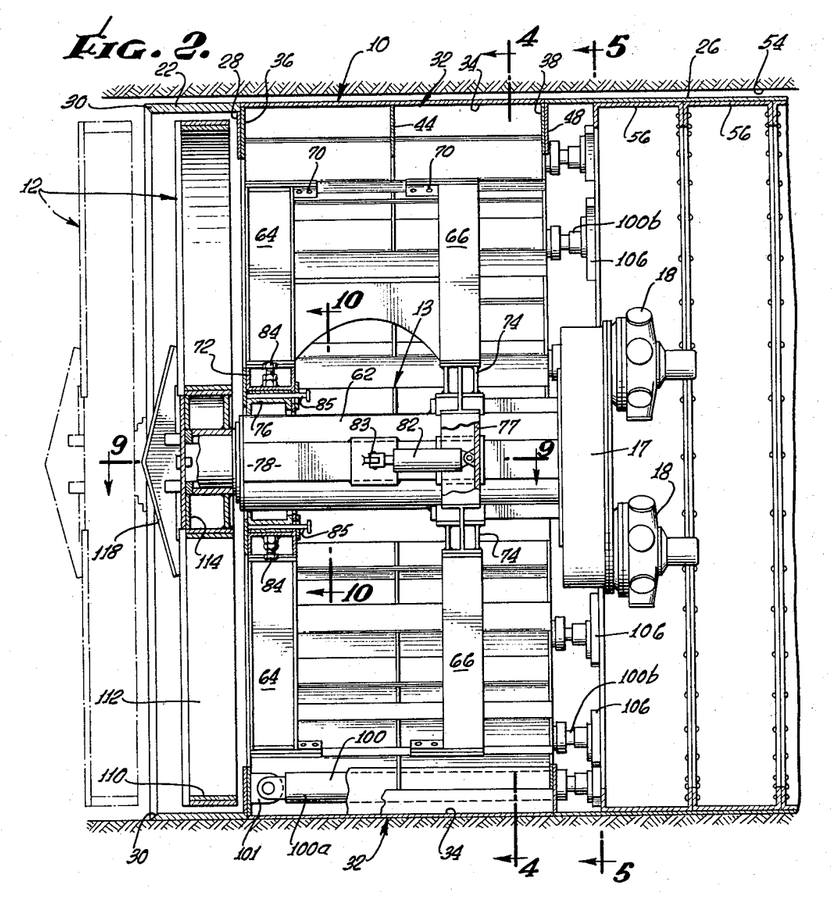
FIGURE 2 is an enlarged longitudinally sectioned view of the tunnel boring machine as in FIGURE 1.

Optionally projecting from the periphery of wheel 110 are adjustable gauging clearance teeth 116, which are used to cut the outside circumference of the tunnel when cutter 12 is extended beyond lead ring 22, as shown in FIGURES 1 and 15. A center aligning member or guide 118, in the shape of a flattened cone, as seen in FIGURES 1 and 2, or a spike 118', as in FIGURE 9, may be secured to the front of hub 114.

Bull gear 16, as before explained, is centrally secured to the rear of drive shaft 14. As shown in FIGURE 14, it is rotated by a pinion gear 122, which is turned by a shaft 124 engaged with a hydraulic motor 18 through a coupling 126. The number and location of motors 18 can vary, each is independently hydraulically operated by a pump connected to a fluid reservoir (neither of which is shown) through conduits 128.

Conveyor 20 is of the endless belt type and is suspended from shell 10 by an adjustable support member 130 connected to the ceiling of shell 10. Spoil 21 accumulating behind cutter 12 piles up against a lower bulkhead 132, best seen in FIGURE 1, adjacent to flange 28, until it flows over the top of bulkhead 132 and slides down a funnel 134 onto the lower end of conveyor 20.

*Operations*

In summary, the tunnel boring machine, of the desired diameter, is assembled and positioned for drilling the tunnel and if the cutter 12 is to be set off center the set screws 84 may be adjusted to accomplish a cutting on the desired line and grade.

The motors 18 are then activated so the cutter 12 will rotate and begin the cutting of the bore 54. Depending upon the soil conditions encountered, the cutter 12 may be extended fully beyond the lead ring 22, partly projecting beyond the ring 22, or fully retracted within the ring 22. The positioning of the cutter 12 is accomplished by the independent extending or retracting of the shaft 14 and cutter 12, or the independent forward or rearward movement of the entire internal assembly 13, as previously described.

In order to urge the assembly 13 forward, the rams 100 are activated and push against either the push ring element 105 or the tunnel liners 56. As the rams push, the assembly 13 is moved forward at a speed dependent upon the cutting of the bore, to the extended reach of the rams. At this point the rams are retracted, the tunnel liners are inserted behind the machine, and the operation repeated, or if the ring element 105 is utilized it is dragged forward to a new position.

To prevent the shell 10 from rotating and drafting off line and grade during drilling, the stabilizer fins 86 are extended and bite into the sides of the tunnel, and the fin shoe 92a is extended to engage the bottom of the tunnel.

In drilling tunnel systems for sewer line or water lines it usually becomes necessary to dig tunnels of varying diameters. This is particularly true when digging sewer or water lines where there is a central tunnel of relatively large diameter, and feeder tunnels which join the central tunnel and which are of a reduced diameter. With the present invention, segments 32 may be removed while the machine is in the tunnel, and the legs 64 and 66 replaced with legs of the proper size, a new cutter 12, shell lead section 22 and tail shield section 26 of proper diameters so that a tunnel of reduced size may be drilled.

Conversely, if a tunnel of larger diameter is desired, the tunnel may be enlarged for a short distance, by hand or other means, and the machine changed to drill the new diameter without the necessity of bringing the machine to the surface and substituting a larger diameter tunnel boring machine.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and devices.

What is claimed is:

1. A tunnel boring machine comprising a generally cylindrical outer shell slightly smaller in diameter than the tunnel to be drilled thereby, wherein said outer shell includes a forward lead ring, a central main housing composed of segments which can be added or subtracted to change the diameter thereof, and a rear shield, a forward set of legs and a rear set of legs extending inwardly from the internal surface of said shell, a drive shaft housing supported for axially slidable movement by the inner ends of each of said forward and rear sets of legs, said drive shaft housing being generally axially aligned with said shell and radially movable within said forward set of legs in order to circumferentially angle the axis of said drive shaft housing relative to the axis of said shell, ram means for axially moving said drive shaft housing, adjustable screw means for radially moving said drive shaft housing within said forward legs, a drive shaft rotatably supported within said drive shaft housing and axially aligned therewith, a cutter wheel axially mounted on the forward end of said drive shaft and located so that it can be extended forward of said shell or retracted within said shell when said drive shaft housing is moved axially, a bull gear axially mounted on the rear end of said drive shaft, motor means engaged with said bull gear so as to be able to rotate it, and axially aligned ram means engaged with the interior of said shell which can be extended to engage structures behind said tunnel boring machine so as to provide a means for pushing said machine forward.

2. A tunnel boring machine comprising a generally cylindrical outer shell slightly smaller in diameter than the tunnel to be drilled thereby, wherein said outer shell includes a forward lead ring, a central main housing composed of segments rigidly but detachably secured together and which can be added or subtracted to change the outside diameter thereof, and a rear shield, a forward set of legs and a rear set of legs extending inwardly from the internal surface of said main housing and slidably mounted thereon for movement parallel to the axis of said shell, a drive shaft housing supported by the inner ends of each of said forward and rear sets of legs axially aligned with the axis of said shell, extendable ram means for axially moving said drive shaft housing, a drive shaft rotatably supported within said drive shaft housing and axially aligned therewith, a cutter wheel axially mounted on the forward end of said drive shaft and located so that it can be extended forward of said shell or retracted within said shell when said drive shaft housing is moved axially, a bull gear axially mounted on the rear end of said drive shaft, motor means engaged with said bull gear so as to be able to rotate it, and axially aligned ram means engaged with the interior of said shell which can be extended to engage structures behind said tunnel boring machine so as to provide a means for pushing said machine forward.

3. A tunnel boring machine comprising a forwardly extending, rotatable cutter, cutter drive means engaged with and adapted to rotate said cutter, an exterior shell having a surface exposed to the earth of a bore being cut, said shell having a longitudinal axis extending therethrough, support means for slidably mounting said cutter drive means within said shell, means for axially moving said cutter relative to said shell, machine moving means for pushing said tunnel boring machine forward within a tunnel and wherein a central portion of said exterior shell is made of sections which can be removed, added, and adjusted relative to each other so as to vary the exposed diameter of said shell, disconnectable means rigidly interconnecting adjacent sections, and wherein said cutter drive means includes means for adjustably angling said cutter circumferentially of said central axis to change the line and grade of said tunnel, and wherein said machine moving means are independently actuatable and cooperate with the means for adjustably angling said cutter whereby said exterior shell will be urged in the direction assumed by the cutter, and a fixable push structure extending rearwardly of said exterior shell remote from said cutter connected to said machine moving means whereby said machine moving means may bear against said fixable push structure and push said machine forward.

4. A tunnel boring machine as defined in claim 3, wherein said fixable push structure is a ring and includes a plurality of connected sections radially extendable to fixedly engage said tunnel, yet be readily retractable for movement within said tunnel.

5. A tunnel boring machine comprising a substantially cylindrical outer shell which includes a main housing portion made of sections which can be added and removed so as to provide a change of diameter of said main housing portion, an internal assembly substantially axially aligned with the axis of said shell, support means by which said shell supports said assembly for axial movement therein, said internal assembly including an axially extending rotatably mounted drive shaft, a cutter wheel axially mounted to the forward end of said drive shaft and positioned adjacent to the forward edge of said shell and diametrically normal thereto, said cutter wheel being slightly smaller in diameter than the diameter of said shell, rotary drive means connected to the opposite end of said drive shaft from said cutter wheel, means for rotating said drive means so as to turn said drive shaft and said cutter wheel, means for axially moving said internal assembly relative to said shell, means for axially pushing the tunnel boring machine forward in a tunnel, the sections of the main housing having side walls and being longitudinally aligned around the periphery of said main housing, and triangular wedge elements being interposed between the adjacent sections to fill the space between the side walls of said adjacent sections when said sections are added or removed to change the diameter of said main housing from a diameter where said side walls abut adjacent side walls in flush relationship.

6. A tunnel boring machine comprising a substantially cylindrical outer shell which includes a main housing portion made of sections which can be added and removed so as to provide a change of diameter of said main housing portion, an internal assembly substantially axially aligned with the axis of said shell, support means by which said shell supports said assembly for axial movement therein, said internal assembly including an axially extending rotatably mounted drive shaft, a cutter wheel axially mounted to the forward end of said drive shaft and positioned adjacent to the forward edge of said shell and diametrically normal thereto, said cutter wheel being slightly smaller in diameter than the diameter of said shell, rotary drive means connected to the opposite end of said drive shaft from said cutter wheel, means for rotating said drive means so as to turn said drive shaft and said cutter wheel, means for axially moving said internal assembly relative to said shell, means for axially pushing the tunnel boring machine forward in a tunnel, the support means for the internal assembly including a set of forward legs and a set of rear legs each of which extends from engagement with said internal assembly outward to engagement with the shell, each of the legs fixedly engaging the shell and slidably engaging the internal assembly, the mounting of said internal assembly within the forward set of legs being radially adjustable so that the axis of said internal assembly can be circumferentially angled relative to the axis of said shell.

7. A tunnel boring machine comprising a forwardly extending rotatable cutter, cutter drive means engaged with and adapted to rotate said cutter, an exterior shall having a surface exposed to the earth of a bore made by the cutter, support means for slidably mounting said cutter drive means within said shell, means for axially moving said cutter relative to said shell, machine moving means for pushing said tunnel boring machine forward within a tunnel, a central portion of said exterior shell embodying an articulated construction comprising a plurality of circumferential sections collectively defining a generally circular cylinder, disconnectable means rigidly securing each section to a circumferentially adjacent section, said central portion being adapted to alteration in diameter of the exposed surface for operation in different size bores by adding or removing sections.

8. A machine as defined in claim 7 wherein each section has an arcuate externally exposed surface conforming to a right cylindrical configuration when a predetermined number of sections are assembled, an interrupted cylinder is formed when fewer sections than the predetermined number are incorporated and a clamshell cylinder is formed when more sections than the predetermined number are added.

9. A machine as defined in claim 7 wherein each section comprises a face plate, and side plates and bolts connect a side plate of one section with the adjacent side plate of an adjacent section.

10. A machine as defined in claim 9 wherein V wedges are interposed between adjacent side plates with the apex disposed axially inward of the shell when fewer sections are incorporated, and disposed axially outward of the shell when more sections are added.

11. A tunnel boring machine comprising a forwardly extending rotatable cutter, cutter drive means engaged with and adapted to rotate said cutter, an exterior shell enclosing at least a portion of said drive means, support means for slidably mounting said drive means within said shell, said exterior shell comprising a portion having an outer surface exposed to the earth of the bore being cut, the shell comprising a forward lead ring, a central segmented main housing, and a rear protective shield, the ring, housing and shield being disposed in coaxial alignment, the central housing comprising a plurality of segments circumferentially disposed and disconnectable means rigidly securing each segment to an adjacent one whereby the diameter of the housing may be altered for operation in different size bores by adding or removing segments, means detachably securing the rear end of the lead ring to the forward end of the housing, and means detachably securing the rear end of the housing to the forward end of the protective shield, whereby ready substitution of lead ring and protective shield may be made to correspond with change in diameter of the main housing.

12. A machine as defined in claim 11 wherein the means detachably securing the rear end of the lead ring to the forward end of the housing comprises a radially disposed flange on the lead ring and a front end plate on each segment, and the means detachably securing the rear end of the housing to the forward end of the protective shield comprises a rear end plate on each segment and a radially disposed flange on the shield.

References Cited

UNITED STATES PATENTS

| | | | |
|---|---|---|---|
| 524,149 | 8/1894 | Stanley | 299—58 |
| 902,517 | 10/1908 | Wittich | 175—230 |
| 1,333,491 | 3/1920 | Hughes | 299—31 |
| 1,554,723 | 9/1925 | Hamilton | 299—31 |
| 1,839,888 | 1/1932 | O'Rourke | 61—85 |
| 1,948,707 | 2/1934 | Gilman | 61—85 |
| 2,837,325 | 6/1958 | Biedess | 175—99 X |
| 2,919,121 | 12/1959 | Ruth | 299—31 |
| 3,134,580 | 5/1964 | Helm | 299—31 X |

FOREIGN PATENTS

| | | |
|---|---|---|
| 659,229 | 3/1963 | Canada. |

ERNEST R. PURSER, *Primary Examiner.*